(12) United States Patent
Odai

(10) Patent No.: US 12,459,116 B2
(45) Date of Patent: Nov. 4, 2025

(54) CONTROL DEVICE AND AUTOMATIC WORK METHOD

(71) Applicant: Hitachi, Ltd., Tokyo (JP)

(72) Inventor: Masaki Odai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 201 days.

(21) Appl. No.: 18/273,416

(22) PCT Filed: Oct. 29, 2021

(86) PCT No.: PCT/JP2021/040079
§ 371 (c)(1),
(2) Date: Jul. 20, 2023

(87) PCT Pub. No.: WO2022/158079
PCT Pub. Date: Jul. 28, 2022

(65) Prior Publication Data
US 2024/0116177 A1 Apr. 11, 2024

(30) Foreign Application Priority Data
Jan. 21, 2021 (JP) .................. 2021-007903

(51) Int. Cl.
B25J 9/16 (2006.01)
B25J 13/08 (2006.01)

(52) U.S. Cl.
CPC ............ *B25J 9/163* (2013.01); *B25J 9/1694* (2013.01); *B25J 13/08* (2013.01)

(58) Field of Classification Search
CPC . B25J 9/163; B25J 9/1694; B25J 13/08; B25J 9/1674; G05B 2219/39271;
(Continued)

(56) References Cited

U.S. PATENT DOCUMENTS

| 10,576,635 | B2 | 3/2020 | Ogawa et al. |
| 11,318,619 | B2 | 5/2022 | Ogawa et al. |
| 2003/0088991 | A1* | 5/2003 | Fullerton ............ G01B 5/08 33/555.1 |
| 2006/0230403 | A1* | 10/2006 | Crawford ......... G05B 19/41865 718/100 |

(Continued)

FOREIGN PATENT DOCUMENTS

| EP | 3342558 A1 | 7/2018 |
| JP | 2014-124735 A | 7/2014 |

(Continued)

OTHER PUBLICATIONS

Nagai et al. (WO2018221053A1.translate); Remote Operation Robot Control System and Remote Operationrobot Control Method; Hitachi GE Nuclear Energy Ltd. (Year: 2018).*

(Continued)

*Primary Examiner* — B M M Hannan
(74) *Attorney, Agent, or Firm* — Volpe Koenig

(57) ABSTRACT

A control device according to an aspect of the present invention comprises: a progress information output unit that determines the progress of work on the basis of sensor data, obtained from at least one among a work device and the work environment of the work device, and sensor data during normal progress of the work device, and outputs progress information indicating the progress of work; a management unit that generates an operation command of the work device on the basis of the progress information, and outputs the operation command; and a control unit that generates a driving signal for driving the work device on the basis of the operation command and the sensor data, and outputs said driving signal to the work device.

10 Claims, 8 Drawing Sheets

(58) Field of Classification Search
CPC ........... G05B 2219/39288; G05B 2219/39289; G05B 2219/39295; G05B 2219/39312; G05B 19/4063; G05B 2219/37544
USPC ........................................................ 700/245
See application file for complete search history.

(56) References Cited

U.S. PATENT DOCUMENTS

| | | | |
|---|---|---|---|
| 2009/0024239 A1* | 1/2009 | Yoshioka | G06Q 10/06 700/110 |
| 2010/0185414 A1* | 7/2010 | Yamamoto | G05B 23/0224 702/183 |
| 2018/0243897 A1 | 8/2018 | Hashimoto et al. | |
| 2018/0272535 A1 | 9/2018 | Ogawa et al. | |
| 2019/0291277 A1 | 9/2019 | Oleynik | |
| 2020/0041994 A1* | 2/2020 | Alalao | H04W 4/40 |
| 2020/0130192 A1 | 4/2020 | Ogawa et al. | |
| 2022/0011736 A1* | 1/2022 | Ishimura | G05B 23/027 |
| 2022/0016770 A1 | 1/2022 | Matsuoka et al. | |
| 2022/0253335 A1* | 8/2022 | Bequet | G06N 3/084 |

FOREIGN PATENT DOCUMENTS

| | | | | |
|---|---|---|---|---|
| JP | 2017-030135 A | 2/2017 | | |
| JP | 2018-158391 A | 10/2018 | | |
| JP | 2020-124760 A | 8/2020 | | |
| WO | 2019/021508 A1 | 1/2019 | | |
| WO | WO-2021106883 A1 * | 6/2021 | ............. | H04N 7/183 |

OTHER PUBLICATIONS

Extended European Search Report issued on Dec. 3, 2024 for European Patent Application No. 21921182.8.
Goerner, J. G., et al., "The Application of Error Correcting Learning Machines to Linear Dynamic Systems", Journal, Bell Aerosystems Company, National Electronics Conference, (1965).
Davies, W. D. T., "State of the Art and Survey of Learning Control Applications", Proceedings of the 1972 IEEE Conference on Decision and Control and 11th Symposium on Adaptive Processes, New Orleans, LA, USA, (1972).
Fu, K., "Learning Control Systems—Review and Outlook", IEEE Transactions on Pattern Analysis and Machine Intelligence, (1986).
Koren, Y., "Adaptive Control Systems for Machining", American Control Conference, Atlanta, GA, USA, (1988).
International Search Report, PCT/JP2021/040079, Jan. 11, 2022, 2 pgs.
Written Opinion of the International Search Authority, PCT/JP2021/040079, 7 pgs.
Japanese Office Action issued on Mar. 5, 2024 for Japanese Patent Application No. 2021-007903.

* cited by examiner

FIG. 3

| No | ANGLE | | | | DETERMINATION RESULT |
|---|---|---|---|---|---|
| | ACTUAL SENSOR DATA | NORMAL PROGRESS DATA | ERROR | THRESHOLD (10°) | |
| 0000 | 2.8° | 0.0° | 2.8° | < | OK |
| 0001 | -3.2° | 0.2° | -3.4° | < | OK |
| 0002 | 0.8° | 0.8° | 0.0° | < | ⋮ |
| 0003 | 2.8° | 1.8° | 1.0° | < | OK |
| 0004 | 5.1° | 3.0° | 2.1° | < | OK |
| ⋮ | ⋮ | ⋮ | ⋮ | ⋮ | OK |
| 0101 | 240.1° | 244.8° | -4.7° | < | ⋮ |
| 0102 | 240.8° | 247.2° | -6.4° | < | OK |
| 0103 | 238.2° | 249.6° | -11.4° | > | NG |

CONTROL DEVICE AND AUTOMATIC WORK METHOD

TECHNICAL FIELD

The present invention relates to a control device and an automatic work method.

BACKGROUND ART

In related art, there is known an automatic work system that outputs an operation command to a work device such as a robot that autonomously operates to cause the work device to perform work such as transportation of a work object at a work site. For example, PTL 1 describes a robot system including a robot that takes out a specific workpiece from a plurality of workpieces placed in a disorderly manner including a state of being stacked in bulk, and a machine learning device that learns operation of the robot.

CITATION LIST

Patent Literature

PTL 1: JP 2017-30135 A

SUMMARY OF INVENTION

Technical Problem

In such a system, it is determined whether or not operation has been normally completed at the end of the work (operation) by the robot, and it is determined whether or not to transition to the next operation on the basis of a result of the determination. PTL 1 describes acquiring a result of taking out a workpiece by a hand portion of a robot from output data from three-dimensional measurement equipment, and acquiring a degree of achievement when the taken out workpiece is transferred to a subsequent process.

However, in the technique described in PTL 1, it is not possible to determine progress of the work while the robot is performing operation. Thus, even in a case where the work does not progress correctly, it is not possible to immediately grasp the fact, which delays execution of recovery operation and lowers throughput of the entire work.

The present invention has been made in view of the above circumstances, and an object of the present invention is to enable determination of progress of work during operation of a work device.

Solution to Problem

A control device according to one aspect of the present invention is a control device that controls operation of a work device that performs work. The control device includes: a progress information output unit configured to determine progress of the work on the basis of sensor data obtained from at least one of a work device or a work environment of the work device and normal progress sensor data obtained during normal progress of the work by the work device and output progress information indicating the progress of the work; a management unit configured to generate and output an operation command of the work device on the basis of the progress information; and a control unit configured to generate a drive signal for driving the work device on the basis of the operation command input from the management unit and the sensor data and output the drive signal to the work device.

Further, an automatic work method according to one aspect of the present invention is an automatic work method by a control device that controls operation of a work device that performs work, and includes procedure of determining progress of the work on the basis of sensor data obtained from at least one of the work device or a work environment of the work device and normal progress sensor data obtained during normal progress of the work by the work device and outputting progress information indicating the progress of the work, procedure of generating and outputting an operation command of the work device on the basis of the progress information, and procedure of generating a drive signal for driving the work device on the basis of the input operation command and the sensor data and outputting the drive signal to the work device.

Advantageous Effects of Invention

According to at least one aspect of the present invention, it is possible to determine progress of work during operation of a work device.

Problems, configurations, and effects other than those described above will be clarified by the following description of embodiments, and the like.

BRIEF DESCRIPTION OF DRAWINGS

FIG. 3 is a view illustrating an example of progress determination by a progress information output unit on the basis of comparison between normal progress sensor data and actual sensor data according to the first embodiment of the present invention.

DESCRIPTION OF EMBODIMENTS

Figure 1:
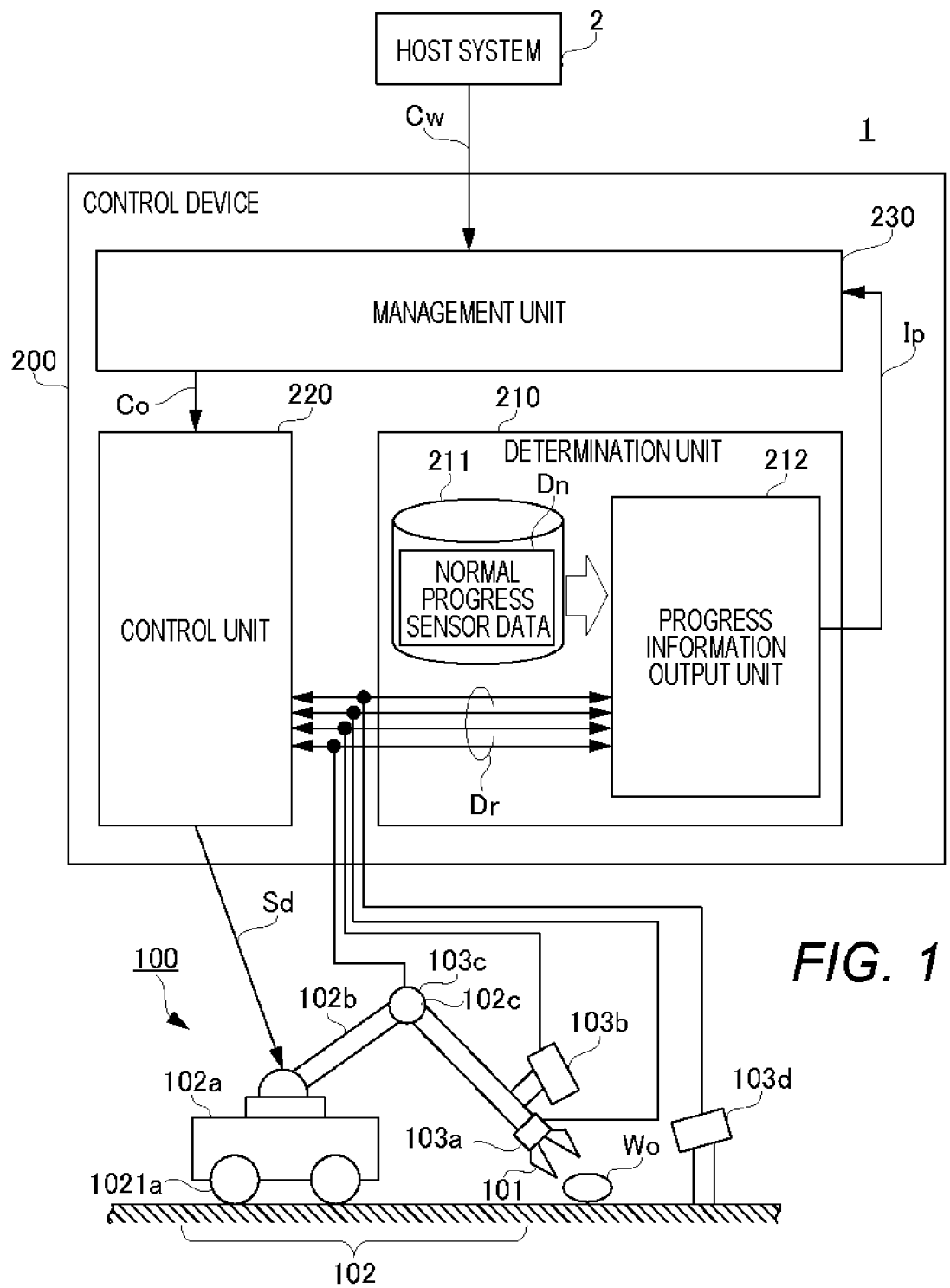
FIG. 1 is a view schematically illustrating a configuration example of an automatic work system according to a first embodiment of the present invention.

Hereinafter, examples of modes for carrying out the present invention (hereinafter, referred to as "embodiments") will be described with reference to the accompanying drawings. The present invention is not limited to the embodiments, and various numerical values, and the like, in the embodiments are examples. Further, in the present specification and the drawings, the same components or components having substantially the same function are denoted by the same reference numerals, and redundant description is omitted.

First Embodiment

[Configuration of Automatic Work System]

FIG. 1 is a view schematically illustrating a configuration example of an automatic work system according to a first embodiment of the present invention. As illustrated in FIG. 1, an automatic work system 1 includes a work device 100 and a control device 200.

The work device 100 includes a work portion 101 and a positioning portion 102. The work portion 101 is a grip portion capable of performing operation of gripping and releasing a work object Wo.

The positioning portion 102 includes a main body portion 102a and an arm 102b. The main body portion 102a has wheels 1021a and moves in the work site by the wheels 1021a. The arm 102b is an arm (manipulator) provided with the work portion 101 at a distal end portion thereof, and a joint portion 102c is provided in the middle of the arm 102b. The joint portion 102c is a mechanism that changes a posture of the arm 102b in a vertical (pitch) direction.

A base portion of the arm 102b is supported by the main body portion 102a. The positioning portion 102 changes a position and posture of the arm 102b to determine a position and posture of the work portion 101, thereby causing the work portion 101 to perform predetermined work.

The work device 100 further includes a force sensor 103a, a camera 103b, an angle sensor 103c, and an environment sensor 103d. The force sensor 103a detects a value indicating reaction force of the arm 102b at the time of work and outputs the value to a control unit 220 and a progress information output unit 212. The camera 103b captures an image of a work area where work by the work portion 101 is performed and outputs the captured image to the control unit 220 and the progress information output unit 212. The angle sensor 103c detects a value (angle) indicating a posture of the arm 102b and outputs the value to the control unit 220 and the progress information output unit 212.

The environment sensor 103d is a sensor capable of observing a work environment of the work device 100, and includes, for example, a temperature sensor capable of measuring a temperature of the work site. The environment sensor 103d outputs the measured temperature to the control unit 220 and the progress information output unit 212.

In the following description, in a case where it is not necessary to distinguish the force sensor 103a, the camera 103b, the angle sensor 103c, and the environment sensor 103d, they are collectively referred to as a sensor 103. Note that the sensor 103 is not limited to the above-described sensor as long as it can observe content of work by the work device 100, a status of work, and the like. For example, the sensor 103 may be a microphone that collects sound at the work site, an observer that estimates joint torque of the arm 102b on the basis of a drive current of a drive signal and an output value of the angle sensor 103c, or the like.

The control device 200 includes a determination unit 210, the control unit 220, and a management unit 230. The determination unit 210 includes a storage unit 211 and the progress information output unit 212. The storage unit 211 includes, for example, a hard disk drive (HDD), a solid state drive (SSD), or the like, and normal progress sensor data Dn is stored in the storage unit 211. The normal progress sensor data Dn is actual sensor data Dr (hereinafter, referred to as "actual sensor data") obtained when work by the work device 100 is normally progressing.

The normal progress sensor data Dn can be generated, for example, by an operator (user) operating an operation input unit 54 (see FIG. 2) of the control device 200 to cause the work device 100 to perform predetermined work and using the actual sensor data Dr acquired by each sensor 103 at that time.

The progress information output unit 212 determines progress of the work by the work device 100 on the basis of the normal progress sensor data Dn stored in the storage unit 211 and the actual sensor data Dr output from each sensor 103 and generates progress information Ip indicating the progress of the work. For example, the progress information output unit 212 compares the normal progress sensor data Dn with the actual sensor data Dr and determines that the work by the work device 100 is normally progressing if an error between both pieces of data is less than a predetermined threshold.

On the other hand, if the error between both pieces of data is equal to or greater than the predetermined threshold, it is determined that an abnormality has occurred in the progress of the work by the work device 100. Then, the progress information output unit 212 outputs the determination result to the management unit 230 as the progress information Ip.

In the present embodiment, an example has been described in which the progress information output unit 212 determines the progress of the work by the work device 100 on the basis of the error between the normal progress sensor data Dn and the actual sensor data Dr, but the present invention is not limited thereto. The progress information output unit 212 may determine the progress of the work by the work device 100 on the basis of a matching rate between the normal progress sensor data Dn and the actual sensor data Dr.

Further, the progress information output unit 212 does not need to use all the sensor data of the force sensor 103a, the camera 103b, the angle sensor 103c, and the environment sensor 103d when generating the progress information Ip. The progress information output unit 212 can generate the progress information Ip using at least one of the sensor data.

Note that a generation and output cycle of the progress information Ip based on progress information output unit progress information 203 may be the same as or longer than a generation and output cycle of a drive signal Sd by the control unit 220. For example, it is assumed that the generation and output cycle of the progress information Ip is set to a cycle longer than the generation and output cycle of the drive signal Sd by the control unit 220. In this case, the actual sensor data Dr is not input to the progress information output unit progress information 203 in the generation and output cycle of the drive signal Sd, but is input in a longer cycle (intermittently).

On the basis of a work command Cw input from a host system 2 and the progress information Ip input from the progress information output unit 212, the management unit 230 calculates a parameter necessary for operation that should be currently performed by the work device 100 to generate an operation command Co. Then, the management unit 230 outputs the operation command Co to the control unit 220.

The control unit 220 calculates a drive signal Sd for driving the work device 100 on the basis of the operation command Co input from the management unit 230 and the actual sensor data Dr output from each sensor 103 and outputs the drive signal Sd to the work device 100. The work device 100 operates according to the operation command Co by the drive signal Sd and executes predetermined work.
[Hardware Configuration Example of Computer]

Figure 2:
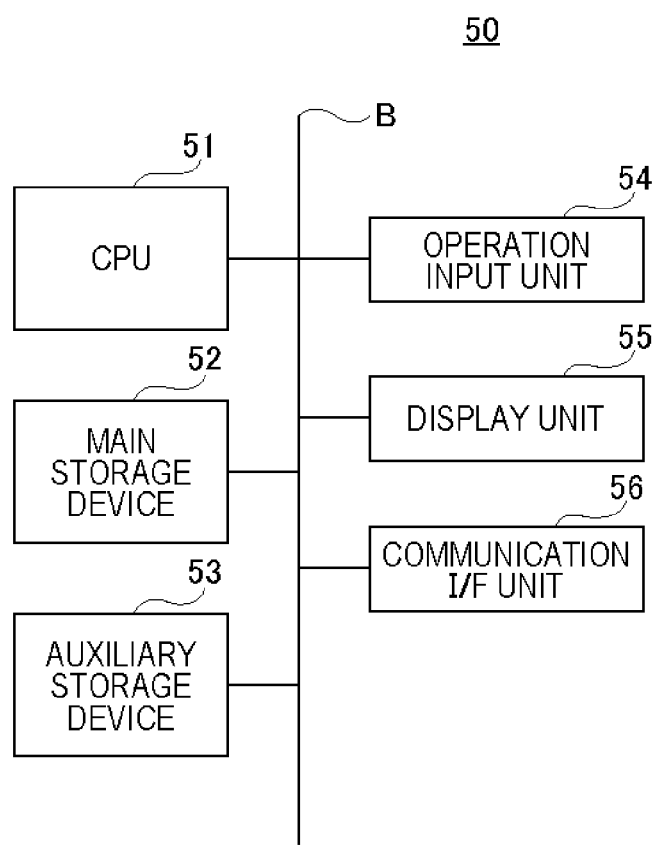
FIG. 2 is a block diagram illustrating a configuration example of hardware constituting a control device according to the first embodiment of the present invention.

Next, a hardware configuration of each device for implementing functions of the control system of the control device 200 of the automatic work system 1 illustrated in FIG. 1 will be described with reference to FIG. 2. FIG. 2 is a block diagram illustrating a configuration example of hardware constituting the control device 200.

A computer 50 illustrated in FIG. 2 is hardware to be used as a computer to be used in the control device 200 of the automatic work system 1. The computer 50 includes a central processing unit (CPU) 51, a main storage device 52, an auxiliary storage device 53, an operation input unit 54, a display unit 55, and a communication interface (I/F) unit 56. The units constituting the computer 50 are communicably connected to each other via a bus B.

The CPU 51 reads a software program for implementing each function of the control device 200 from the auxiliary storage device 53, loads the program into the main storage device 52 and executes the program. The function of each unit in the control device 200 is implemented by the CPU 51 executing the program. Instead of the CPU, another processing device such as a micro processing unit (MPU) may be used.

The main storage device 52 includes a random access memory (RAM) and the like, and variables, parameters, and the like, generated during arithmetic processing of the CPU 51 are temporarily written in the main storage device 52. The variables, parameters, and the like, written in the main storage device 52 are appropriately read by the CPU 51.

The auxiliary storage device 53 includes a hard disk drive (HDD), a solid state drive (SSD), a flexible disk, an optical disk, a magneto-optical disk, a CD-ROM, a CD-R, a magnetic tape, a non-volatile memory, and the like. The auxiliary storage device 53 is used as an example of a computer-readable non-transitory recording medium storing a program to be executed by the computer 50. The auxiliary storage device 53 records an operating system (OS), various parameters, a program for causing the computer 50 to function, and the like. The function of the storage unit 211 of the control device 200 is implemented by the auxiliary storage device 53.

The operation input unit 54 includes, for example, a mouse, a keyboard, and the like. The operation input unit 54 generates an operation signal corresponding to content of operation input by the user and outputs the operation signal to the CPU 51.

The display unit 55 is a display device including, for example, a liquid crystal display (LCD), an organic electro luminescence (EL) display, or the like. The display unit 55 displays the progress information Ip, and the like, generated by the progress information output unit 212 of the work device 100. Note that the operation input unit 54 and the display unit 55 may be integrally formed as a touch panel.

The communication I/F unit 56 includes, for example, a network interface card (NIC), or the like. The communication I/F unit 56 controls operation of transmitting/receiving various data to be performed between the work device 100 and each sensor 103 via a wired or wireless line connected to the NIC.
[Outline of Progress Determination Method by Progress Information Output Unit]

Next, outline of a work progress determination method by the progress information output unit 212 will be described with reference to FIG. 3. FIG. 3 is a view illustrating an example of progress determination by the progress information output unit 212 based on comparison between the normal progress sensor data Dn and the actual sensor data Dr. FIG. 3 illustrates comparison between the normal progress sensor data Dn and the actual sensor data Dr in the form of a table.

The table indicated in FIG. 3 includes items of "No.", "angle", and "determination result". In the item of "No.", numbers allocated in the input order to a set of the actual sensor data Dr and the normal progress sensor data Dn input for each predetermined period are stored. The item of "angle" includes items of "actual sensor data", "normal progress sensor data", "error", and "threshold (10)°".

In the item of "actual sensor data", a value of sensor data output from the angle sensor 103c (see FIG. 1) is stored, and in the item of "normal progress sensor data", the normal progress sensor data Dn is stored. The normal progress sensor data Dn is actual sensor data Dr output from the angle sensor 103c in a case where the work device 100 is operating normally (the progress of work is normal) and is stored in the storage unit 211 in advance.

In the item of "error", a value indicating an error between the normal progress sensor data Dn and the actual sensor data Dr is stored, and in the "threshold", an equal sign or an inequality sign indicating a magnitude relationship with respect to a threshold provided for the error is stored.

In the item of "determination result", a value of "OK" indicating that the progress of the work by the work device 100 is normal or a value of "NO" indicating that the progress of the work by the work device 100 is abnormal is stored.

For example, in a record of No. "0000", a value of "actual sensor data" is "2.8°", "a value of" "normal progress data" is "0.0°", "0.0°", an absolute value of "error" is "2.8°", and a magnitude relationship with respect to "10°" which is a threshold is "<" (smaller than the threshold). In other words, "2.8°" that is the error between the actual sensor data of the angle sensor 103c and the normal progress data is smaller than "10°" that is the threshold, and thus, the progress information output unit 212 determines that the progress of the work by the work device 100 is normal.

On the other hand, in No. "0103", the value of the "actual sensor data" is "238.2°", the value of the "normal progress data" is "249.6°", and the "error" is "−11.4°". In other words, it is indicated that the absolute value of the error is greater than the threshold "10°" (the magnitude relationship with respect to the threshold "10°" is ">"). As a result, the progress information output unit 212 determines that an abnormality has occurred in the progress of the work by the work device 100.

This determination result is output as the progress information Ip to the management unit 230 by the progress information output unit 212. Then, the control unit 220 that has received the notification from the management unit 230 takes appropriate measures such as recovery operation. The recovery operation includes, for example, operation in which the arm 102b grasps the work object Wo dropped from the work portion 101 again, operation in which positions, postures, and the like, of the main body portion 102a, the arm 102b, and the like, are returned to the initial positions, and the like.

Note that the progress information output unit 212 may display the progress information Ip on the display unit 55 (see FIG. 2) when an abnormality in the progress of the work is detected. In this event, the progress information output unit 212 may also display information such as necessity and type of recovery operation on the display unit 55. Then, a user may be allowed to select a type of recovery operation to be performed in the future. Furthermore, the progress information output unit 212 may notify the user of the abnormality of the progress via a lamp, a speaker, or the like (not illustrated).

In addition, FIG. 3 illustrates an example in which the progress information output unit 212 calculates an error between the actual sensor data Dr and the normal progress sensor data Dn every time the actual sensor data Dr and the normal progress sensor data Dn are input to generate the progress information Ip, but the present invention is not limited thereto. For example, the progress information output unit 212 may calculate a sum of squares of the error for each predetermined time segment and generate the progress information Ip on the basis of the value of the sum of squares.

In addition, FIG. 3 illustrates that the actual sensor data to be used for determining the progress of the work of the work device 100 is the actual sensor data Dr of the angle sensor 103c, but the present invention is not limited thereto. The actual sensor data Dr from another sensor 103 such as the force sensor 103a or the camera 103b may be used.

For example, in a case where the camera 103b is used as the sensor 103, the normal progress sensor data Dn is an image captured in advance by the camera 103b as a captured image in a case where the progress of the work of the work device 100 is normal. The actual sensor data Dr is an image captured by the camera 103b during actual work by the work device 100. In a case where the progress of the work by the work device 100 is normal, the position, posture, and the like, of the arm 102b of the work device 100 in the captured image should coincide with those in the normal progress sensor data Dn. Thus, in a case where the progress of the work by the work device 100 is normal, a matching rate between the normal progress sensor data Dn and the actual sensor data Dr also increases. Thus, in a case where the matching rate between the normal progress sensor data Dn and the actual sensor data Dr is equal to or greater than a predetermined threshold, or the like, the progress information output unit 212 can determine that the work by the work device 100 is normally progressing.

In addition, for example, in a case where the sensor 103 is the environment sensor 103d (temperature sensor), the normal progress sensor data Dn is the temperature measured by the environment sensor 103d in a case where the work progress of the work device 100 is normal. The actual sensor data Dr is a temperature measured by the environment sensor 103d during actual work by the work device 100.

For example, in a case where an abnormality occurs in a current of a motor that drives the arm 102b and the temperature exceeds a temperature assumed as a temperature of a portion of the arm 102b, the measured temperature as the actual sensor data Dr becomes higher than the measured temperature as the normal progress sensor data Dn. In this case, the error between the normal progress sensor data Dn and the actual sensor data Dr is greater than a predetermined threshold. Thus, in a case where the error between the normal progress sensor data Dn and the actual sensor data Dr is less than the predetermined threshold, or the like, the progress information output unit 212 can determine that the work by the work device 100 is normally progressing.

Furthermore, a plurality of pieces of actual sensor data obtained by the plurality of sensors 103 may be used as the actual sensor data Dr to be used for determining the progress of the work of the work device 100.

[Automatic Work Method by Control Device]

Figure 4:
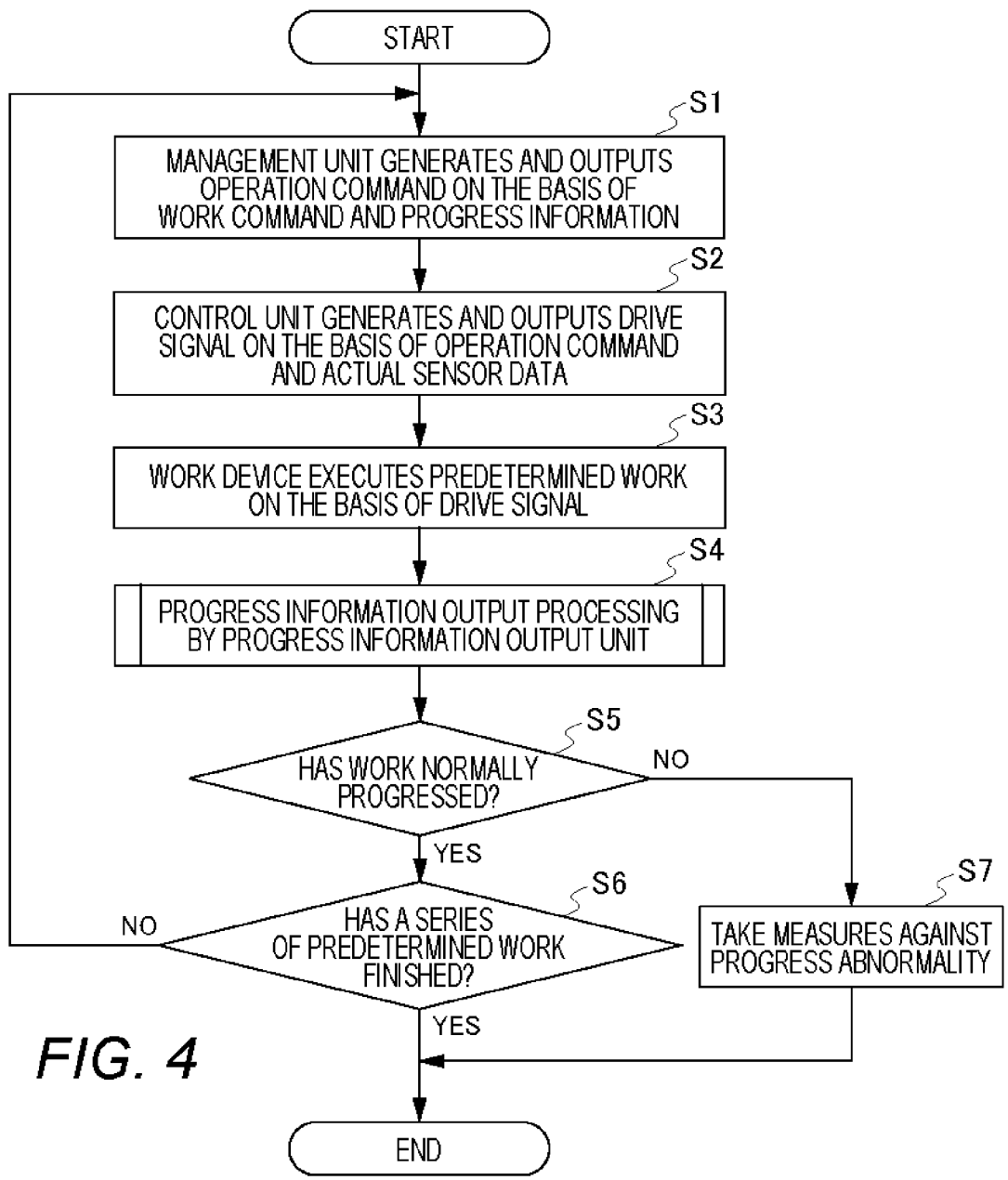
FIG. 4 is a flowchart illustrating an example of procedure of an automatic work method by the control device according to the first embodiment of the present invention.
Figure 5:
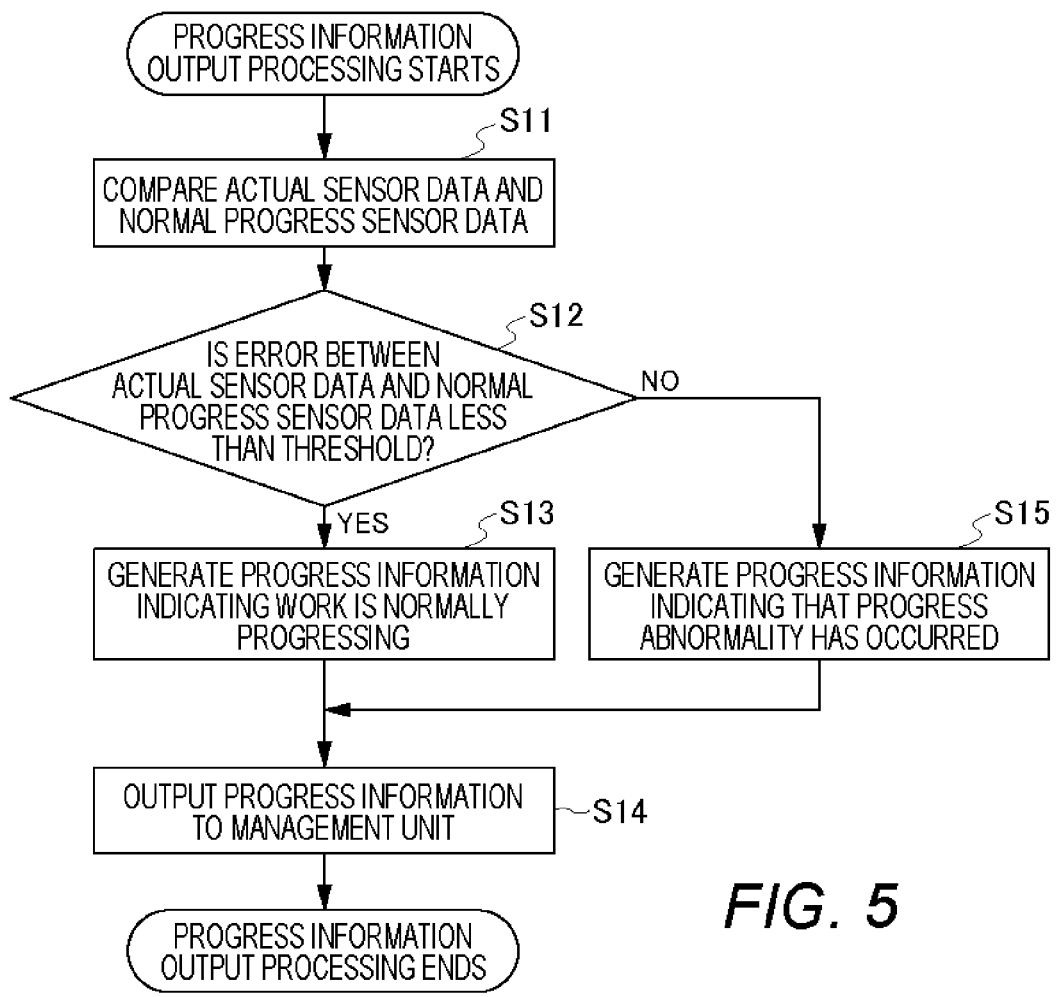
FIG. 5 is a flowchart illustrating an example of procedure of progress information output processing to be executed in the automatic work method according to the first embodiment of the present invention.

Next, an automatic work method by the control device 200 of the present embodiment will be described with reference to FIGS. 4 and 5. FIG. 4 is a flowchart illustrating an example of procedure of an automatic work method by the control device 200, and FIG. 5 is a flowchart illustrating an example of procedure of progress information output processing to be executed in the automatic work method.

First, the management unit 230 of the control device 200 generates the operation command Co on the basis of the work command Cw input from the host system 2 and the progress information Ip input from the progress information output unit 212 and outputs the operation command Co to the control unit 220 (step S1). Next, the control unit 220 generates the drive signal Sd on the basis of the operation command Co input from the management unit 230 and the actual sensor data Dr input from each sensor 103 and outputs the drive signal Sd to the work device 100 (step S2).

Next, the work device 100 executes predetermined work on the basis of the drive signal Sd input from the control unit 220 (step S3). Next, progress information output processing by the progress information output unit 212 is executed (step S4). Details of the progress information output processing by the progress information output unit 212 will be described in detail with reference to FIG. 5.

Next, the control unit 220 determines whether or not the work has progressed normally (step S5). In a case where it is determined in step S5 that the work has progressed normally (step S5: Yes), the control unit 220 determines whether or not the work device 100 has finished a series of work (step S6). In a case where it is determined in step S6 that the series of work has not been finished (step S6: No), the control unit 220 returns the processing to step S1 and continues the processing. On the other hand, in a case where it is determined that the series of work has been finished (step S6: Yes), the automatic work method by the control device 200 ends.

In a case where it is determined in step S5 that the work has not progressed normally (step S5: No), the control unit 220 takes measures against the progress abnormality (step S7).

Examples of the measures against the progress abnormality include a measure that stops operation of the work device 100, a measure that causes the work device 100 to perform recovery operation, and the like. After the processing of step S7, the automatic work method by the control device 200 ends.

Next, the procedure of the progress information output processing to be performed in step S4 of FIG. 4 will be described with reference to FIG. 5. First, the progress information output unit 212 compares the actual sensor data Dr output from each sensor 103 with the normal progress sensor data Dn (step S11). Next, the progress information output unit 212 determines whether or not an error between the actual sensor data Dr and the normal progress sensor data Dn is less than a threshold (step S12).

In a case where it is determined in step S12 that the error is less than the threshold (step S12: Yes), the progress information output unit 212 generates the progress information Ip indicating that the work by the work device 100 is normally progressing (step S13). Next, the progress information output unit 212 outputs the generated progress information Ip to the management unit 230 (step S14). After the processing of step S14, the progress information output processing by the progress information output unit 212 ends.

On the other hand, in a case where it is determined in step S12 that the error is equal to or greater than the threshold (step S12: No), the progress information output unit 212 generates the progress information Ip indicating that an abnormality has occurred in the progress of the work by the work device 100 (step S15). Next, the progress information output unit 212 performs the processing of step S14. In other words, the progress information output unit 212 outputs the generated progress information Ip to the management unit 230.

In the present embodiment, the progress information output unit 212 sequentially generates the progress information Ip on the basis of the actual sensor data Dr output from each sensor 103 during work by the work device 100 and the normal progress sensor data Dn. Thus, according to the present embodiment, the user can determine the progress of the work by the work device 100 while executing the work by the work device 100. This also allows the user to take appropriate measures such as recovery operation at an appropriate timing, so that it is possible to prevent decrease in throughput of the work by the work device 100.

Note that, in the above-described embodiment, an example has been described in which the progress information output unit 212 generates the progress information Ip with reference to the error (or the matching rate) between the normal progress sensor data Dn and the actual sensor data Dr, but the present invention is not limited thereto. For example, the progress information output unit 212 may generate the progress information Ip using a learning model.

Figure 6:
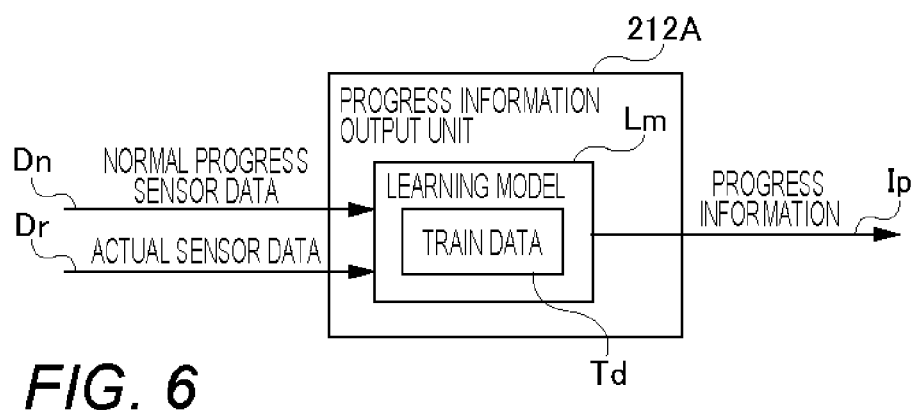
FIG. 6 is a view illustrating a configuration example of a progress information output unit that generates progress information using a learning model according to the first embodiment of the present invention.

FIG. 6 is a view illustrating a configuration example of a progress information output unit 212A that generates the progress information Ip using the learning model. As illustrated in FIG. 6, the progress information output unit 212A includes a learning model Lm (an example of a first learning model). The learning model Lm generates and outputs the progress information Ip on the basis of the input normal progress sensor data Dn and the actual sensor data Dr. It is assumed that the learning model Lm has learned in advance to output the progress information Ip that reduces an error between the progress information Ip and train data Td (an example of first train data) provided in advance.

The learning model Lm can be generated, for example, by the user inputting learning data to cause the learning model Lm to learn. The learning model Lm may be generated in advance in the control device 200 or may be generated in a terminal device, a server, or the like, (not illustrated) connected to the control device 200. In addition, in the present embodiment, an example of using the learning model Lm having the train data Td has been described, but the present invention is not limited thereto. A learning model without train data may be used.

By configuring the progress information output unit 212A with the learning model Lm, the progress information output unit 212A can appropriately generate the progress information Ip even in a case where, for example, an environment color changes due to change in a light amount at the work site, or the like, and an output value of an optical sensor as an example of the environment sensor 103d rapidly changes. In other words, the progress information output unit 212A can robustly determine the progress of the work.

In a case where the progress information output unit 212A is configured as described above, the progress information output unit 212A may output, as the progress information Ip, not only the determination result of the progress of the work by the work device 100 but also information such as a type of the abnormality, a degree of the abnormality, necessity of recovery operation, and a type of the recovery operation in a case where the abnormality occurs in the progress. In other words, the progress information output unit 212A can output any information as the progress information Ip as long as the information can be prepared as the train data Td at the time of learning by the learning model Lm. Furthermore, the progress information output unit 212A may output a plurality of pieces of progress information Ip corresponding to a plurality of pieces of information. By configuring the progress information output unit 212A as described above, the control device 200 can grasp information regarding the progress of the work of the work device 100, information regarding the recovery operation, and the like, in more detail.

Further, the user may cause the learning model Lm of the progress information output unit 212A to also learn information on time history (time series). This can further improve, accuracy (reliability) of the progress information Ip output by the progress information output unit 212A. Note that also learning the information on the time history by the learning model Lm can be implemented by inputting a trend of the time history of the actual sensor data Dr including a sudden change to the learning model Lm as the train data Td and causing the learning model Lm to learn the trend, or by configuring the learning model Lm with a model capable of learning the information on the time history. Examples of the learning model that can learn the information on the time history include a long short-term memory (LSTM).

Second Embodiment

[Configuration of Determination Unit]

Figure 7:
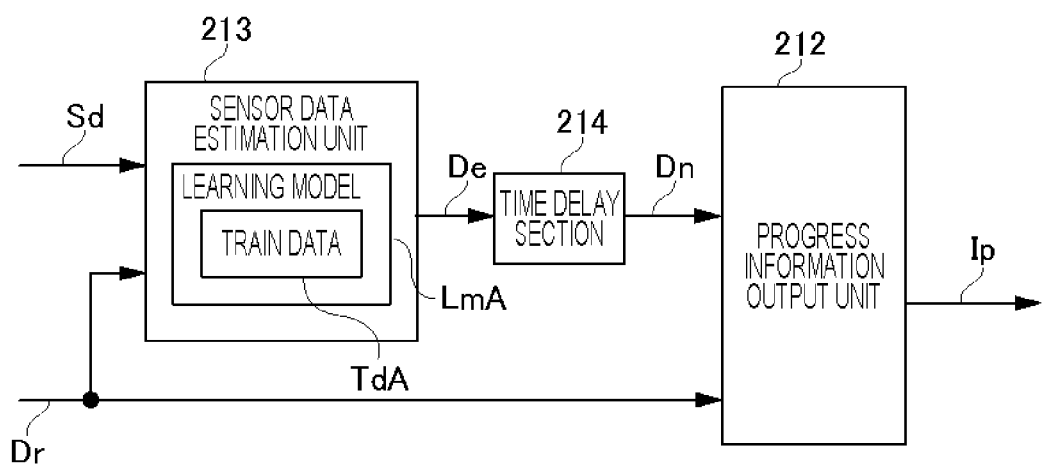
FIG. 7 is a block diagram illustrating a configuration example of a control system of a determination unit of a control device of an automatic work system according to a second embodiment of the present invention.

Next, an automatic work method by the control device 200 according to the second embodiment of the present invention will be described with reference to FIG. 7. FIG. 7 is a block diagram illustrating a configuration example of a control system of a determination unit 210A of the control device 200 of the automatic work system 1. As illustrated in FIG. 7, the determination unit 210A includes a sensor data estimation unit 213, a time delay section 214, and a progress information output unit 212.

The sensor data estimation unit 213 includes a learning model LmA (an example of a second learning model). The learning model LmA generates and outputs estimated sensor data De on the basis of the input drive signal Sd and the actual sensor data Dr. The estimated sensor data De is sensor data at the time (hereinafter, referred to as "estimated time") advanced by a period N from current time T.

In this event, the learning model LmA generates the estimated sensor data De such that an error between the estimated sensor data De and train data TdA becomes small on the basis of the learned content. Specifically, the learning model Lm compares the estimated sensor data at the estimated time advanced by the period N from the current time T in the train data TdA with the estimated sensor data De output from the learning model Lm and generates the estimated sensor data De that can minimize the error.

The train data TdA (an example of second train data) can be constituted with the actual sensor data Dr of each sensor 103 in a case where the work device 100 normally works on the basis of the drive signal Sd output from the control unit 220 by operation by the user. Then, the sensor data estimation unit 213 can generate the estimated sensor data De using the actual sensor data Dr at the estimated time (current time T+N) in the train data Td and the drive signal Sd at the current time.

The time delay section 214 (an example of a time delay unit) holds the estimated sensor data De input from the sensor data estimation unit 213 until the estimated time (current time T+N) arrives and outputs the estimated sensor data De to the progress information output unit 212 as the normal progress sensor data Dn when the estimated time arrives. The time delay section 214 can include, for example, a memory, or the like, capable of holding the estimated sensor data De for the period N. With such a configuration of the time delay section 214, the determination unit 210A can handle the estimated sensor data De at the estimated time advanced by the period N from the time T as the normal progress data Dn when the current time reaches the estimated time.

The progress information output unit 212 generates the progress information Ip on the basis of the actual sensor data Dr output from each sensor 103 and the normal progress sensor data Dn input from the time delay section 214 and outputs the progress information Ip to the management unit 230 (see FIG. 1). Note that the progress information output unit 212 may generate the progress information Ip on the basis of an error (matching rate) between the normal progress sensor data Dn and the actual sensor data Dr or may generate the progress information Ip using the learning model Lm (see FIG. 6).

By applying the learning model LmA to the progress information output unit 212, the progress information output unit 212 can generate and output appropriate progress information Ip on the basis of the normal progress sensor data Dn generated according to the work environment. In other words, according to the present embodiment, the progress information output unit 212 can generate and output the progress information Ip including appropriate determination content even in a situation where it is difficult to prepare the normal progress sensor data Dn in advance due to the work site where the work environment is likely to change.

Also in the present embodiment, similarly to the first embodiment, the learning model LmA may be caused to learn the information on the time history. For example, by causing the learning model LmA to learn the actual sensor data Dr corresponding to the history of work by the work device 100 up to certain time as learning data, accuracy of the estimated sensor data De output by the sensor data estimation unit 213 can be further improved. Note that also learning the information on the time history by the learning model LmA can also be implemented by constituting the learning model Lm with a model capable of learning the information on the time history such as LSTM, similarly to the first embodiment.

[Method for Generating and Outputting Normal Progress Sensor Data by Determination Unit]

Figure 8:
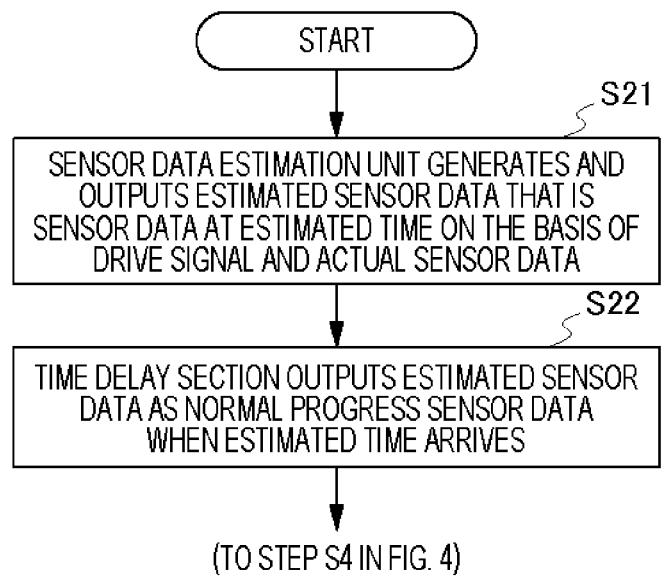
FIG. 8 is a flowchart illustrating an example of procedure of a method of generating and outputting normal progress sensor data by the determination unit according to the second embodiment of the present invention.

Next, a method for generating and outputting the normal progress sensor data Dn by the determination unit 210A according to the second embodiment of the present invention will be described with reference to FIG. 8. FIG. 8 is a flowchart illustrating an example of procedure of a method for generating and outputting the normal progress sensor data Dn by the determination unit 210A.

First, the sensor data estimation unit 213 generates estimated sensor data De that is sensor data at the estimated time on the basis of the drive signal Sd and the actual sensor data Dr and outputs the estimated sensor data De to the progress information output unit 212 (step S21). Next, when the estimated time arrives, the time delay section 214 outputs the estimated sensor data De generated in step S21 to the progress information output unit 212 as the normal progress sensor data Dn (step S22). After the processing in step S22, the determination unit 210A returns the processing to step S4 in FIG. 4. In other words, the progress information output processing is performed by the progress information output unit 212.

Note that a generation and output cycle of the normal progress sensor data Dn by the sensor data estimation unit 213 may be the same as or longer than a generation and output cycle of the drive signal Sd by the control unit 220. For example, it is assumed that the generation and output cycle of the normal progress sensor data Dn is set to a cycle longer than the generation and output cycle of the drive signal Sd by the control unit 220. In this case, the actual sensor data Dr is not input to the sensor data estimation unit in the generation and output cycle of the drive signal Sd, but is input to the sensor data estimation unit 213 in a longer cycle (intermittently).

Note that the present invention is not limited to each of the above-described embodiments, and it goes without saying that various other application examples and modifications can be taken without departing from the gist of the present invention described in the claims.

For example, the above-described embodiments describe the components of the device (control device) and the system (automatic work system) in detail and specifically in order to describe the present invention in an easy-to-understand manner, and are not necessarily limited to those having all the described configurations. In addition, part of the components of a certain embodiment described here can be replaced with the components of another embodiment. Furthermore, the components of a certain embodiment can be added to the components of another embodiment. In addition, it is also possible to add, delete, or replace other components for part of the components of each embodiment.

In addition, control lines and information lines indicated by solid lines in FIG. 2 indicate what is considered to be necessary for the description, and not all the control lines and information lines on the product are necessarily indicated. In practice, it may be considered that almost all the components are connected to each other.

Furthermore, in the present specification, the processing steps describing the time-series processing include not only processing to be performed in time series according to the described order, but also processing to be executed in parallel or individually (for example, parallel processing or processing by an object) even if the processing is not necessarily performed in time series.

Furthermore, each component of the control device according to the embodiments of the present disclosure described above may be implemented in any hardware as long as the hardware can transmit and receive information to and from each other via a network. Furthermore, the processing to be performed by a certain processing unit may be implemented by one piece of hardware or may be implemented through distributed processing by a plurality of pieces of hardware.

REFERENCE SIGNS LIST 1 automatic work system
50 computer
100 work device
101 work portion
103a force sensor
103b camera
103c angle sensor
103d environment sensor
200 control device
203 progress information output unit progress information
210 determination unit
210A determination unit
211 storage unit
212 progress information output unit
212A progress information output unit 213 sensor data estimation unit
220 control unit
230 management unit

The invention claimed is:

1. A control device that controls operation of a work device that performs work, the control device comprising:
a central processing unit (CPU), a main storage device, and an auxiliary storage device, a software program loaded in the main storage device, executed by the CPU and performing:
determining progress of the work on a basis of sensor data obtained from at least one of the work device or a work environment of the work device and normal progress sensor data obtained during normal progress of the work by the work device and output progress information indicating the progress of the work;
generating and outputting an operation command of the work device on a basis of the progress information; and
generating a drive signal for driving the work device on a basis of the operation command input from the management unit and the sensor data and output the drive signal to the work device,
wherein
the CPU is further configured to apply a first data processing operation to the determining of the progress of the work, and
the first data processing operation receives the normal progress sensor data and the sensor data as inputs, and outputs the progress information having a value that makes an error from first train data provided in advance less than a predetermined threshold.

2. The control device according to claim 1, wherein
the determining of the progress of the work determines that an abnormality has occurred in the progress of the work in a case where a matching rate between the sensor data and the normal progress sensor data is less than a predetermined threshold, and determines that the progress of the work is normal in a case where the matching rate between the sensor data and the normal progress sensor data is equal to or greater than the predetermined threshold.

3. The control device according to claim 1, wherein
the determining of the progress of the work outputs at least one of information indicating whether the progress of the work is normal or abnormal, a type of the progress of the work, a degree of an abnormality in a case where the progress of the work is abnormal, necessity of recovery operation, or a type of the recovery operation as the progress information.

4. The control device according to claim 1, wherein
the first data processing operation includes a data processing function capable of processing information on a time history.

5. The control device according to claim 2, wherein
a generation cycle of the progress information by the determining of the progress of the work is a cycle equal to or longer than a generation cycle of the drive signal by the generating of the drive signal.

6. The control device according to claim 1, the CPU further configured for performing:
generating estimated sensor data at a time point advanced by a predetermined period on a basis of the sensor data and the drive signal; and
adding a delay of the predetermined period to the estimated sensor data and output the estimated sensor data after the delay to the the determining of the progress of the work as the normal progress sensor data.

7. The control device according to claim 6, wherein
the generating estimated sensor data includes a second data processing operation, and
the second data processing operation receives the drive signal and the sensor data as inputs, and outputs estimated sensor data having a value that makes an error from second train data provided in advance less than a predetermined threshold.

8. The control device according to claim 7, wherein
the second data processing operation includes a data processing function capable of processing with information on a time history.

9. The control device according to claim 7, wherein
a generation cycle of the estimated sensor data by the generating estimated sensor data is a cycle equal to or longer than a generation cycle of the drive signal by the generating of the drive signal.

10. An automatic work method by a control device that controls operation of a work device that performs work, the automatic work method comprising:
procedure of determining progress of the work on a basis of sensor data obtained from at least one of the work device or a work environment of the work device and normal progress sensor data obtained during normal progress of the work by the work device and outputting progress information indicating the progress of the work;
procedure of generating and outputting an operation command of the work device on a basis of the progress information; and
procedure of generating a drive signal for driving the work device on a basis of the input operation command and the sensor data and outputting the drive signal to the work device,
applying a first data processing operation to the procedure of determining progress of the work
wherein
the first data processing operation receives the normal progress sensor data and the sensor data as inputs, and outputs the progress information having a value that makes an error from first train data provided in advance less than a predetermined threshold.

* * * * *